(12) United States Patent
Petillon

(10) Patent No.: US 7,911,380 B2
(45) Date of Patent: Mar. 22, 2011

(54) HYBRID POSITIONING METHOD AND DEVICE

(75) Inventor: Jean-Paul Petillon, Miramas (FR)

(73) Assignee: Eurocopter, Marignane Codex (FR)

( * ) Notice: Subject to any disclaimer, the term of this patent is extended or adjusted under 35 U.S.C. 154(b) by 136 days.

(21) Appl. No.: 11/915,217

(22) PCT Filed: Feb. 12, 2007

(86) PCT No.: PCT/FR2007/000255
§ 371 (c)(1),
(2), (4) Date: Jan. 16, 2008

(87) PCT Pub. No.: WO2007/099211
PCT Pub. Date: Sep. 7, 2007

(65) Prior Publication Data
US 2009/0278740 A1 Nov. 12, 2009

(30) Foreign Application Priority Data
Mar. 1, 2006 (FR) .................................... 06 01819

(51) Int. Cl.
*G01S 19/47* (2010.01)
(52) U.S. Cl. ................................................. 342/357.3
(58) Field of Classification Search ............ 342/357.01–357.17, 357.2–357.78; 701/7, 216
See application file for complete search history.

(56) References Cited

U.S. PATENT DOCUMENTS

| 5,420,592 | A | * | 5/1995 | Johnson | 342/357.12 |
| 6,122,595 | A | * | 9/2000 | Varley et al. | 701/220 |
| 6,317,688 | B1 | | 11/2001 | Bruckner et al. | |
| 6,697,736 | B2 | * | 2/2004 | Lin | 701/214 |
| 7,471,238 | B2 | * | 12/2008 | Lillo et al. | 342/357.02 |
| 2003/0083792 | A1 | | 5/2003 | Anderson et al. | |

FOREIGN PATENT DOCUMENTS

DE 2 866 423 A1 8/2005

OTHER PUBLICATIONS

International Search Report of PCT/FR2007/000255 filed Feb. 12, 2007, date of mailing Aug. 1, 2007.

* cited by examiner

*Primary Examiner* — Thomas H Tarcza
*Assistant Examiner* — Nga X Nguyen
(74) *Attorney, Agent, or Firm* — Brooks Kushman P.C.

(57) ABSTRACT

The invention relates to a method of determining the position of an aircraft by combining inertial data with range data between the aircraft and satellites, in which: a) the range is stored in a FIFO memory so as make delayed range data available at the output from the memory; b) the delayed range data is combined with inertial data to obtain an estimate of position data for the aircraft; and c) a watch is maintained for the appearance of a fault in the range data, and when such a fault is detected, at least some of the data stored in the FIFO memory is modifying so as to be neutralized.

17 Claims, 2 Drawing Sheets

HYBRID POSITIONING METHOD AND DEVICE

CROSS-REFERENCE TO RELATED APPLICATIONS

The present Application claims priority to and incorporates by reference PCT/FR2007/000255 filed Feb. 12, 2007 and French Application 0601819 filed Mar. 1, 2006.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION (1) Field of the Invention

The present invention relates to a hybrid positioning method and device.

(2) Description of Related Art

The technical field of the invention is that of manufacturing navigation systems mounted on board helicopters.

The present invention relates in particular to a navigation and/or positioning method and device in which inertial measurements are combined with data relating to the distance ranges between a moving body carrying the device (in particular a rotorcraft) and satellites.

In the meaning of the present application, and without explicit or implicit indication to the contrary, the terms "measurement", "data", "signal", and their derivatives are considered as being equivalent, and the verbs "combining", "hybridizing", "coupling", as well as their derivatives are also considered as being equivalent.

Generally speaking, a GPS receiver comprises four main blocks or modules:

a first module is an HF head (also known as an "RF front end") which pre amplifies signals picked up by the antenna of the GPS receiver, and implements a frequency change;

a second module is a clock supplying the other modules with an accurate time and frequency reference; since the accuracy of the clock is not absolute, its time and frequency errors are modeled by means of biases;

a third module is a signal processor module that decodes navigation messages coming from satellites, to supply the ephemerides of the constellation of 24 satellites; this first type of data corresponds to the positions measurements of 24 satellites (or three-dimensional vectors, $$\vec{p}_{sni} = [x_{sni} y_{sni} z_{sni}]$$

for i=1 to 24); this constitutes data that is needed for calculating these 24 positions, assuming that time is known accurately; this module further measures the propagation times of the signals that have been both received, and coming from those satellites that are in view. The number of such signals or the number of channels (NCH) can vary. The calculation of these NHC/distances corresponds to the respective measured propagation durations; the common bias that affects these measurements corresponds to the offset of the clock and can be equivalent to several thousands of kilometers; the ranges as determined in this way are generally referred to as "pseudo-ranges"; in the present application, and unless explicitly or implicitly indicated to the contrary, the terms "range" and "pseudo-range" are used interchangeably to designate distance range data delivered by this receiver module; some receivers also deliver measurements of the derivative in this distance values (called "pseudo-range" rates); and a fourth module is "calculating the navigation solution" and solves the following system of equations:

$$r_i^2 = (x_i - x)^2 + (y_i - y)^2 + (z_i - z)^2 + Ct$$

for i=1 to NCH and in which:

$$\vec{p} = [xyz]^T$$

is the position of the antenna, t being the offset of the clock, and C being the speed of light; since there are four unknowns (x, y, z, t), solving the system requires four scalar equations; when the number of receiver channels exceeds four, the overabundant data is used to reduce error and to increase integrity, e.g. by using the least squares method and by detecting points that depart from the general trend.

This block thus delivers the position and the time of the receiver corrected for its bias, and where appropriate a measurement of the derivative of the position of the moving body, i.e. the velocity of the carrier.

It is known that such range data relative to satellites can be combined with inertial data delivered by an inertial navigation unit on board the moving body, by using a Kalman filter so as to determine the position of the moving body, e.g. as described in the document "GPS and INS integration with Kalman filtering for direct geo-referencing of airborne imagery", ETH Hönggerberg, Zurich, Institute of Geodesy and Photogrammetry.

The meanings of the usual abbreviations as used below are summarized as follows:

AAIM: aircraft autonomous integrity monitoring;
AFCS: automatic flight control system;
ARAS: aircraft based augmentation system;
EGNOS: European geostationary navigation overlay system;
FIFO: first-in, first-out;
FMS: flight management system;
GBAS: ground based augmentation system;
GNSS: global navigation satellite system;
GPS: global positioning system;
INS: inertial navigation system;
PVT: position, velocity, time;
RAIM: receiver autonomous integrity monitoring;
SEAS: spaced-based augmentation system;
TTA: time to alert;
VCO: voltage controlled oscillator;
WAAS: wide area augmentation system.

SUMMARY OF THE INVENTION

A particular object of the invention is to enable breakdowns in a GNSS to be passivated and to enable a hybrid GNSS/INS positioning and/or navigation system to continue operating in survival mode.

Amongst satellite-based navigation systems, after the "Transit" satellite system of the 1970s that enabled a position to be determined once every 90 minutes with one kilometer accuracy, there appeared the GPS navigation system which transmits non-encoded signals i.e. "in clear", known as "Coarse Acquisition" (C/A) signals.

A major limitation of that system is its lack of integrity. Firstly the rate at which satellites break down is of the order of $10^{-4}$ per hour ($h^{-1}$). Secondly, GPS satellites do not communicate one with another. Therefore they do not monitor one another mutually. Finally, the ground segment of the GPS system is not sufficiently dense to provide continuous monitoring of the satellites constellation. The breakdown rate is therefore high, and the time required to inform end users of a breakdown can reach several hours. These two characteristics make the GPS as it stands unusable in applications such as the positioning of a civilian aircraft under instruments flying conditions (IFR).

RAIM, relying on redundancy between the satellites in view, provides only a partial remedy to this situation. When at least five (5) satellites are being picked up and processed by a RAIM receiver, the receiver can generate a plurality of PVT solutions, can compare them with one another, and when a mismatch is detected, can inform the user of the anomaly. If more than five satellites are being processed, then the receiver can locate and exclude a satellite that has broken down.

The drawback is that that type of monitoring leads to protection radii that do not make precision approaches possible, and that the warning radii are of several hundreds of meters.

The purpose of SEAS is to mitigate those limitations, at least in part. A SEAS comprises a continental network of ground stations monitoring the visible portion of the GPS constellation. Real time processing of the data collected by this network serves to identify errors from each of the visible GPS satellites, to identify errors due to the ionospheric propagation delay at each point, with three-dimensional resolution. This is sufficient to make an accurate approach possible at any point on the continent in question, and to detect breakdowns in GPS satellites.

A space segment made up of geostationary satellites can act as a relay for transmitting correction information and information concerning the state of health of the GPS constellation to the receivers of end users; such geostationary satellites also serve as additional navigation data sources, since they transmit navigation messages identical to those from the GPS satellites.

These improvements and additions make it possible to achieve accuracy of meter order (within the three dimensions), with so-called "$10^{-7}$" protection radii of one decameter order (a vertical protection threshold of 20 meters is available for 99.9% of the time), with a TTA delay in detecting and signaling breakdowns of not more than 6 seconds (s) in compliance with the Do229 standard.

Given the continental size of the arrangement and the bandwidth limitations on signals transmitted by geostationary satellites, the processing and the transfer of information cannot be instantaneous.

The TTA delay in detecting a breakdown and informing the end user constitutes one of the cost factors of a SEAS.

The document "GNSS local component integrity concepts" by Charles S. Dixon, Journal of Global Positioning Systems, 2003, Vol. 2, No. 2, pp. 126-134 deals with means for reducing the length of this delay.

A TTA value of 6 seconds is a maximum that can be accepted by an aircraft having a turning rate (rate of heading variation) that does not exceed about 3 degrees per second (3°/s), and for which the rate of roll angle variation is limited to about 4 degrees per second (4°/s).

However, a helicopter on a steep-slope and low-speed approach is much less stable than an airliner traveling at 150 knots on an ILS slope of 3°. It is therefore necessary on board a helicopter to implement piloting relationships that have much higher degrees of authority than those imposed by the 4°/s to 3°/s limitations of an airliner, and that is not compatible with the usual TTA values.

Thus, SEAS (WAAS or EGNOS) that might be a useful source of navigation data for rotorcraft and drones, in particular, are not adapted to aircraft of these types.

The present invention solves this problem by making it possible in particular to passivate GPS satellite breakdowns detected by the SEAS, to reduce down to zero the delay (TTA) in detecting and signaling breakdowns, and to provide a survival mode in the event of the SEAS being lost completely.

Another object of the invention is to propose a system mounted on board or suitable for mounting on board an aircraft for determining its position by hybridizing pseudo-ranges with other measurements, in particular inertial measurements, which system is improved and/or remedies, at least in part, the shortcomings and drawbacks of systems of that type.

According to an aspect of the invention, satellite positioning data is stored temporarily prior to being delivered to a module for hybridizing that data with non-satellite positioning data, and in the event of a fault signal being detected, at least some of the temporarily stored satellite data is modified.

In another aspect of the invention, there is provided a method of positioning a moving body by combining inertial data ($\vec{u}$) with data ($\vec{r}_m$) concerning the ranges between the moving body and satellites, comprising the following steps:

a) storing the range data in a FIFO memory so as to have delayed range data available at the output from the memory;

b) combining (combination operation) the delayed range data with the inertial data to obtain an estimate for position data of the moving body; and c) watching for the appearance of a fault in the range data, and when such a fault is detected, modifying at least some of the data stored in the FIFO memory in a manner that neutralizes (passivates) it, i.e. reduces or cancels its weight (or contribution) in the combination operation.

According to other features of the method:

estimated satellite range data ($\vec{r}_m$) is stored as a function of inertial data and as a function of satellite ephemerides in a second FIFO memory to have delayed estimates available at the output from said memory, while the capacities of the two FIFO memories being equivalent, so that the greatest delay value for the delayed estimate is identical to the greatest delay value for the delayed range data;

the combination operation may include a correction operation comprising subtracting delayed estimates of range data as a function of inertial data from the delayed range data, and weighting (filtering) the result of said subtraction, with a gain (K) that may be constant or variable; the gain may be calculated as a function of the a priori a priori covariance (R) of the errors affecting the range data;

the greatest delay value is of the order of 1 seconds (s) to 6 s;

the storing and combining operations may be performed (at regular time intervals) at a frequency of the order of at least 0.5 Hertz (Hz), in particular of the order of 0.5 Hz to 5 Hz, or of the order of 1 Hz to 10 Hz;

each FIFO memory can store a plurality of successive data vectors ($\vec{r}_m$, $\vec{\hat{r}}$), in particular at least about ten vectors;

each vector ($\vec{r}_m$) of range data generally comprises, for each reception channel (i.e. each satellite), a pseudo-range measurement together with the variance of the error that affects the measurement;

in order to neutralize data stored in the first FIFO memory, it is possible to decrease the degree of confidence associated with said data, i.e. to decrease or cancel (i.e. set to zero) the inverse of the error covariance matrix, and/or to increase (in particular set at a very high value) the error covariance associated with said data.

In another aspect of the invention, an aircraft position-determining device is proposed that is mounted on board or suitable for mounting on board an aircraft, the device comprising:

an inertial unit delivering inertial data; and/or
a satellite range receiver unit delivering range data;
a hybridizing unit connected to the inertial unit to receive the inertial data and connected to the satellite range receiver unit to receive the range data, the hybridizing unit delivering estimated position data as a function of the inertial data and of the range data;
a FIFO memory coupled with (inserted between) the range receiver unit and the hybridization unit for delivering delayed range data to the hybridization unit; and
a neutralization unit responsive to fault data concerning the range data, and arranged, in the presence of said fault data, to modify at least a portion of the range data stored in the memory.

According to further features of the device:
the hybridization unit may comprise:
an estimator unit (19) delivering range estimates that are calculated from the inertial data, from estimated position data from the receiver, and from satellite position data (ephemerides);
a second FIFO memory arranged to store the range estimates and to output delayed estimated range data;
a correction unit comprising a subtraction unit arranged to subtract the delayed estimated range data from the delayed range data delivered by the first FIFO memory; and
an operator of gain (K) arranged to weight the data provided by the subtraction unit;
the hybridization unit may comprise a recursive filter, in particular a Kalman filter; and
the neutralization unit may be connected to the range receiver unit in order to receive the fault data.

The invention may be implemented by a processor of a computer on board an aircraft or suitable for mounting on board an aircraft. When this computer is detecting a faulty status, it executes a program including instructions corresponding to the steps of the method of the invention.

Thus, in an aspect of the invention, a program is provided comprising code usable by an aircraft computer to determine the position of the aircraft by combining inertial data ($\vec{u}$) with range data ($\vec{r}_m$) concerning the ranges between the aircraft and satellites, t. The usable code comprises instructions for:

a) storing range data in a FIFO memory to have delayed range data available at the output from the memory;
b) combining the delayed range data with the inertial data to obtain an estimate ($\vec{\hat{x}}$) for the position data of the aircraft;
c) watching for the appearance of a fault (i.e. when a DSi signal is produced) in the range data, and when a fault is detected, modifying at least a portion of the data stored in the FIFO memory to decrease or zero its weight in the combination operation; and
d) storing the satellite range data estimate ($\vec{\hat{r}}$) as a function of the inertial data in a second FIFO memory to have delayed estimates available at the output from said memory, the capacities of the two FIFO memories being equivalent such that the greatest delay value in the delayed estimate is identical to the greatest delay value in the delayed range data.

The invention makes it possible to passivate GPS receiver breakdowns as well as satellite breakdowns, thereby making it possible to use a longer duration for the integrated built-in test cycle, and can make it possible to avoid installing a second receiver.

BRIEF DESCRIPTION OF THE DRAWINGS

Other aspects, characteristics, and advantages of the invention appear in the following description which refers to accompanying drawings.

DETAILED DESCRIPTION OF THE INVENTION

Figure 1:
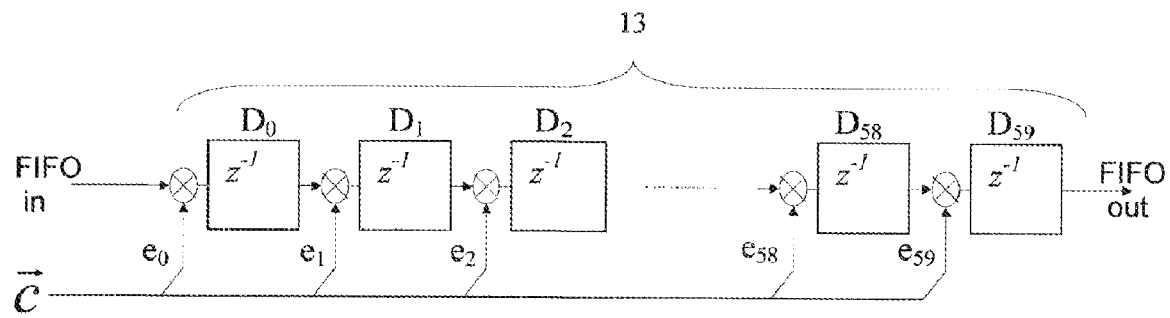
FIG. 1 is a diagram showing the structure of a second register in a system of the invention, together with its connections to the other modules of the system.

The invention is based on putting the measurements performed by the GPS-SBAS receiver into quarantine for a duration that is long enough to guarantee that they are not erroneous (i.e. during 6 seconds for a SBAS complying with the Do229 standard). This quarantining is performed by a shift register 10 (or FIFO memory) interposed between the output from the GPS-SBAS receiver 11 and the Kalman filter 12 (cf. FIG. 4).

Given that piloting the aircraft on the basis of information that is 6 seconds "old" it is not conceived, the device hybridizes the GPS-SBAS measurements with inertial measurements. By installing a second shift register 13 (or FIFO memory) for delaying the inertial data by the same duration as the GPS-SBAS data, hybrid inertial/range data (components of the vector x) presenting no delay is made available upstream from the second register. In addition, the second shift register is considered as a state machine, such that the GPS-SBAS receiver constitutes a particular dynamic observer to which the Kalman filter technique is applied.

Figure 4:
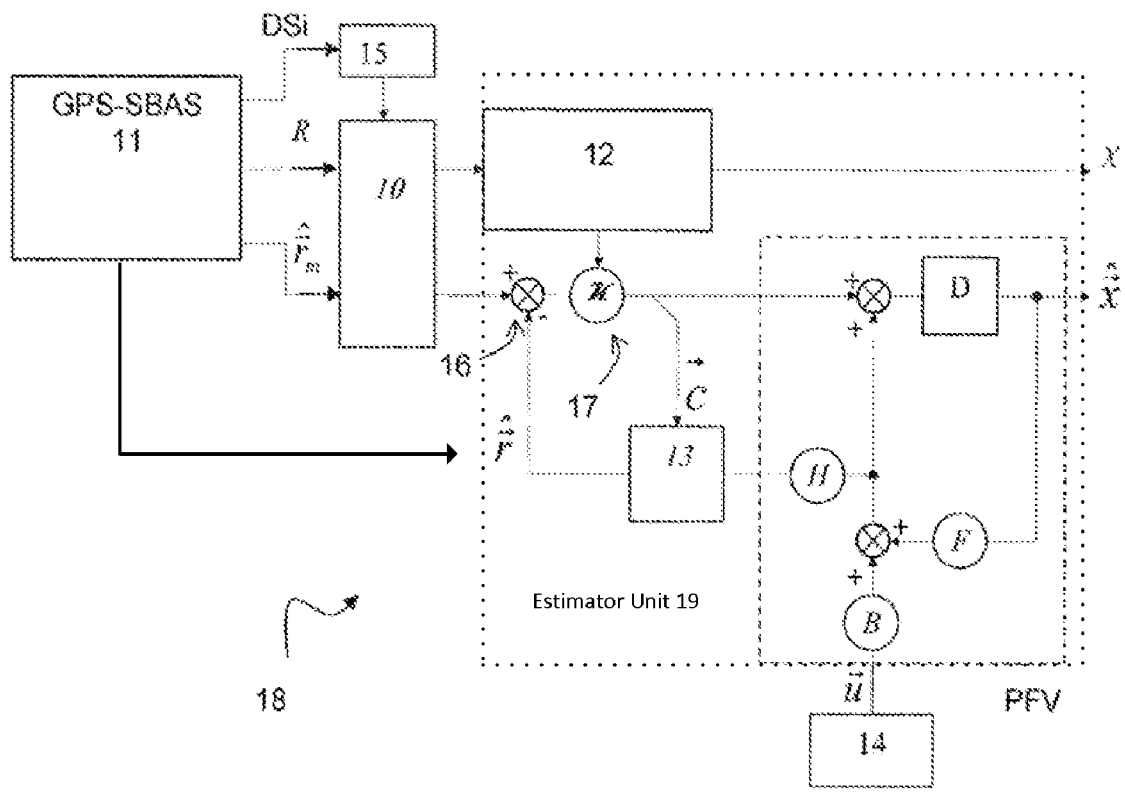
FIG. 4 is a diagram showing the architecture of a hybrid GPS/inertial device or system in accordance with the invention.

The device shown in FIG. 4 comprises two shift registers: a first register 10 for the GPS data, and a second register 13 for the inertial data; the second register is fitted with intermediate inputs $e_0$-$e_{59}$ that enable the Kalman filter to control all of the states of the register (by means of a vector c), as shown diagrammatically in FIG. 1 where the sixty blocks $D_0$-$D_{59}$ marked $z^{-1}$ are individual delay operators, each constituting as many states.

Figure 2:
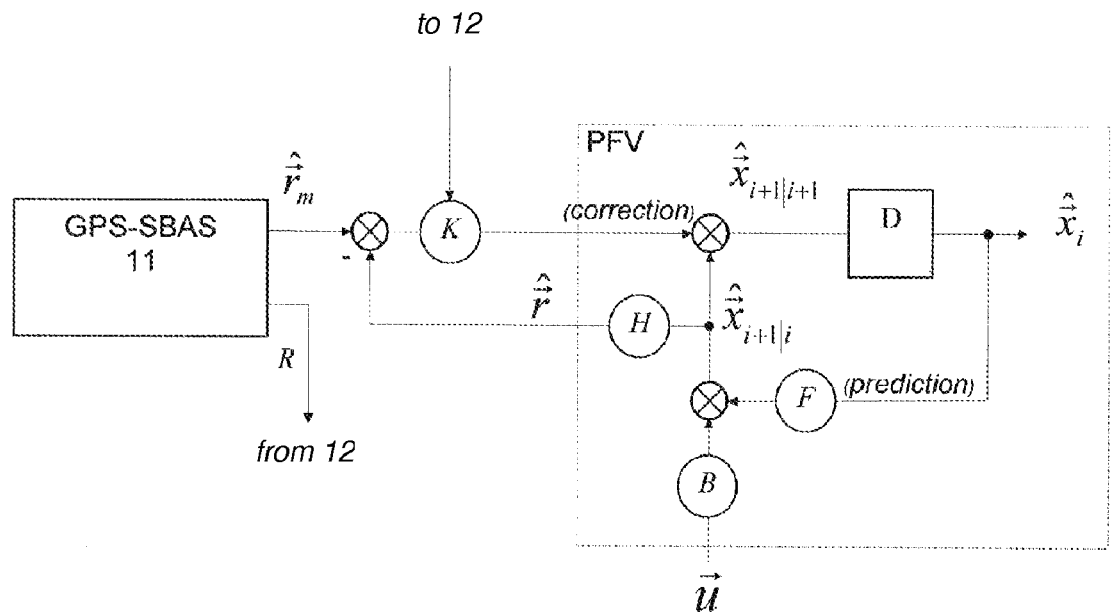
FIG. 2 is a diagram showing the architecture of a conventional hybrid GPS/inertial device or system including a Kalman filter.

FIG. 2 is a diagram showing the architecture of a conventional hybrid GPS/inertial device or system including a Kalman filter.

The system includes a synthetic representation of a virtual platform (VPF), in which:

$\vec{u}$ is the inertial measurement (i.e. the collection of two 3D vectors constituting the acceleration $\vec{\gamma}_m$ and angular velocity $\vec{\omega}_m$ measurements of the aircraft in the carrier frame of reference);

the operator marked "$z^{-1}$" or "D" is an individual delay operator; this operator acting on a vector corresponds to n scalar delay operators;

F, H, and B are matrices characteristic of the virtual platform (the matrices of its state representation); calculation the matrix H involves the positions of all of the satellites;

$\hat{\vec{x}}$ is the estimate of the state vector of the process, i.e. at least the collection of the three Euler angles, the three velocity components, the three position components, and the bias of the GPS receiver clock. Usually, $\hat{\vec{x}}$ also includes Markov states corresponding to modeling errors of the gyros, of the accelerometers, and of the VCO: for example, two additional states per axis and per sensor for modeling the bias and the 1/f noise, giving a vector $\hat{\vec{x}}$ with a total dimension of 24;

$\hat{\vec{r}}$ is the vector of the estimated pseudo-ranges to the satellites.

Although a virtual platform is not a linear process, this representation is valid for the errors that affect the measurements, i.e. the only quantities of interest for optimum hybridization.

This representation shows that the virtual platform receives as inputs six "strap-down" inertial measurements, and delivers as output an estimate of the state vector of the carrier, and that it can be linearized locally.

The other elements shown in the diagram are:
K, the Kalman gain; and
$\hat{\vec{r}}_m$ the vector of measured pseudo-ranges to the satellites (these measurements coming from the GPS-SBAS receiver).

This diagram represents the following equations:

$$\hat{\vec{x}}_{i+1|i} = F\hat{\vec{x}}_i + B\vec{u} \quad \text{(prediction)}$$

$$\hat{\vec{x}}_{i+1|i+1} = K\left(\hat{\vec{r}}_m - H\hat{\vec{x}}_{i+1|i}\right) \quad \text{(correction)}$$

$$\hat{\vec{r}} = H\hat{\vec{x}}_{i+1}$$

If the errors affecting the measured pseudo-ranges measurements and the inertial measurements constitute white noise, if R is the covariance matrix of the errors affecting the pseudo-range measurements, and if U is the covariance matrix of the errors affecting the inertial measurements, then the Kalman gain K and the covariance matrix X for the error affecting the estimate $\hat{\vec{x}}$ of the state of the carrier are determined by the system using the following non-linear recurrence equations:

$$X_{k+1|k} = FX_{k|k}F^T + BUB^T$$

$$K = X_{k+1|k}H^T(HX_{k+1|k}H^T + R)^{-1}$$

$$X_{k+1|k+1} = (I - KH)X_{k+1|k}$$

Figure 3:
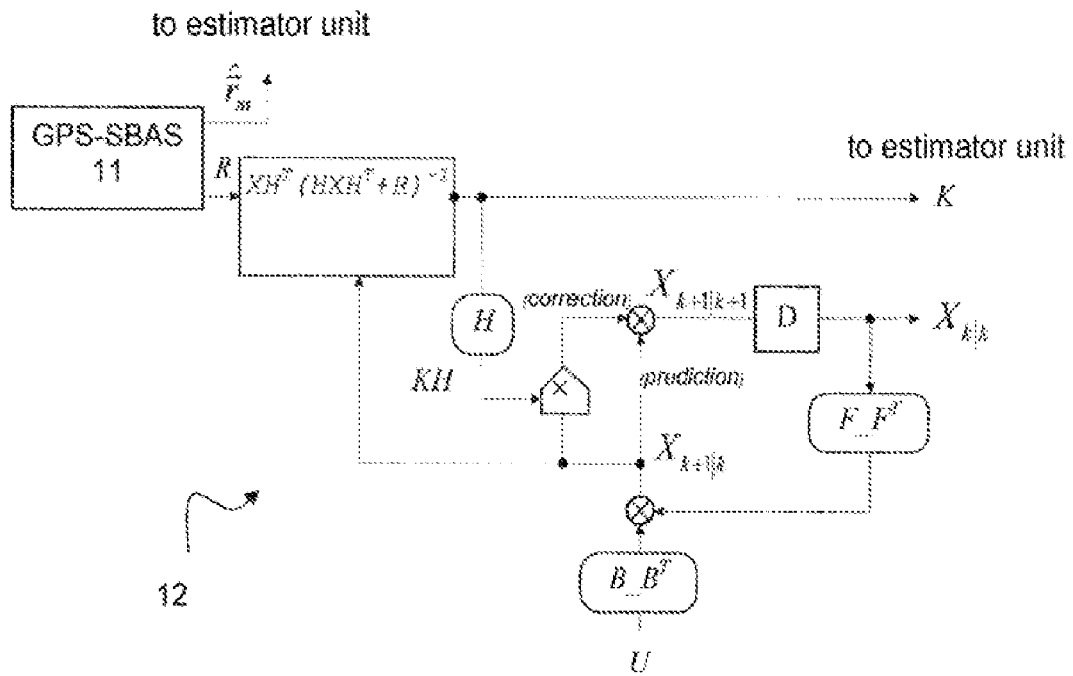
FIG. 3 is a block diagram of a filter gain calculation and covariance calculation module in a conventional hybrid system.

The diagram corresponding to this system is shown in FIG. 3.

A representation of a hybrid system of the invention in which observations are "put into quarantine" is shown in FIG. 4.

The function of the filter is based on the bounded nature of the time taken to detect a breakdown in the measurement device, in this case the GPS-SBAS system. By way of example, this time is at most 6 seconds for a SBAS system complying with Do229.

To avoid any pollution of the VPF with erroneous GPS-SBAS measurements, the pseudo-range measurement and the a priori a priori estimate of their variances, as calculated by the GPS-SBAS receiver are "quarantined" in the shift register 10 having the number n of stages required to ensure that the time taken to travel along the register coincides with the specified maximum detection delay (or is slightly greater); by way of example, a register is selected having sixty stages (6×10=60) for a GPS-SBAS receiver that delivers data at a frequency of 10 Hz and that has a TTA of 6 s.

In the event of the breakdown of a satellite Si being detected, as indicated by a signal DSi (FIG. 4), all of the pseudo-range measurements coming from that satellite and contained in the stages of the shift register 10 at the output from the receiver 11 are marked as invalid (i.e. their variance is forced to an infinite value) by the neutralization module 15 that receives the signal DSi.

These infinite-variance measurements are thus ignored by the filter 12, which simultaneously continues to make use of the measurements relating to the other satellites and to provide a position measurement that is valid with accuracy that is nominal (or hardly degraded providing the number of satellites remaining is sufficient).

After the disappearance of the signal DSi, the time after which valid data leaves the memory, e.g. 1 second, depends on the depth (number of stages) of the shift register 10 and on the frequency at which calculations are iterated.

In the event of a complete breakdown of the positioning system (including a breakdown of the receiver), all of the data from all of the satellites is marked as being invalid, and the filter makes no use of any of the observations and delivers a position that is purely inertia (operating in an open loop) and that has not been polluted.

The optimum filter is determined by applying to the known rule that it is required to constitute an in-line simulation of the process and of its observation means. The second shift register 13 is thus provided at the output from the VPF in a manner that is symmetrical with the register (11) placed at the output form the GPS-SBAS receiver. The stages of this shift register 10 constitute as many additional states of the Kalman filter (6×12=72 states for a 12-channel GPS receiver delivering measurements at 1 Hz and for a TTA of 6 seconds). These states need to be controlled by the filter, so that the loop (vector $\vec{c}$) is closed is closed after the gain K in the block diagram of FIG. 4 to the shift register 13.

The relationship between two successive states (corresponding to two iterations of indices k and (k+1)) of a shift register having its input written e, and output written s, can be written in the following form;

$$\begin{pmatrix} d_0 \\ d_1 \\ \cdots \\ d_{n-2} \\ d_{n-1} \end{pmatrix}_{k+1} = \begin{pmatrix} e \\ d_0 \\ \cdots \\ d_{n-3} \\ d_{n-2} \end{pmatrix}_k$$

$$= \begin{pmatrix} 0 & 0 & \cdots & 0 & 0 \\ 1 & 0 & \cdots & 0 & 0 \\ \cdots & \cdots & \cdots & \cdots & \cdots \\ 0 & 0 & \cdots & 0 & 0 \\ 0 & 0 & \cdots & 1 & 0 \end{pmatrix} \begin{pmatrix} d_0 \\ d_1 \\ \cdots \\ d_{n-2} \\ d_{n-1} \end{pmatrix}_k + \begin{pmatrix} 1 \\ 0 \\ \cdots \\ 0 \\ 0 \end{pmatrix} e$$

-continued $$s = (0\ 0\ \cdots\ 0\ 1) \begin{pmatrix} d_0 \\ d_1 \\ \cdots \\ d_{n-2} \\ d_{n-1} \end{pmatrix}_{k+1}$$

Or in more compact form:

$$\vec{d}_{k+1} = F_F \vec{d}_k + B_F e$$

$$s = H_F \vec{d}_{k+1}$$

in which $F_F$, $B_F$, and $H_F$, are the interconnection matrices made up essentially of 0 (zeros) and a few 1 (ones), where the 1 correspond to connections firstly between the "general" input of the shift register and the input of the first stage of the register, secondly between the output of a stage and the input of the following stage, and finally between the output of the last stage of the register and the "general" output of the shift register.

The platform fitted with its shift register can be transcribed by the following equations:

$$\begin{bmatrix} \hat{\vec{x}}_{k+1} \\ \vec{d}_{k+1} \end{bmatrix} = \begin{bmatrix} F & 0 \\ B_F HF & F_F \end{bmatrix} \begin{bmatrix} \hat{\vec{x}}_k \\ \vec{d}_k \end{bmatrix} + \begin{bmatrix} B \\ B_F HB \end{bmatrix} \vec{u}$$

$$\hat{\vec{r}}_d = [0\ H_F] \begin{bmatrix} \hat{\vec{x}}_k \\ \vec{d}_k \end{bmatrix}$$

Using the following notations:

$$\hat{\vec{x}} = \begin{bmatrix} \hat{\vec{x}} \\ \vec{d} \end{bmatrix},\ F = \begin{bmatrix} F & 0 \\ B_F HF & F_F \end{bmatrix},\ B = \begin{bmatrix} B \\ B_F HB \end{bmatrix}$$

and $$H = [0\ H_F]$$

this can be written:

$$\hat{\vec{x}}_{k+1} = F\hat{\vec{x}}_k + B\vec{u}$$

$$s = H\hat{\vec{x}}_k$$

which can be processed like any other Kalman filter.

In a method of the invention, the dimensions of the vectors and matrices to be calculated for use are increased. For example, for a GPS receiver providing twelve position components at 1 Hz, with a TTA of 6 s, this provides 12×6×1=72 additional states. Thus, the filter implemented by the invention may have several tens or hundreds of states.

Nevertheless, because the matrices handled are essentially "empty", there is generally no need to provide memory for all of these elements, nor is there any need to process systematically all of the elements of the matrices and of these vectors.

The inertial/GPS coupling may be tight or loose; for loose coupling, it is possible to use the position data delivered by the GPS receiver, where appropriate together with velocity data; for tight coupling, it is possible to use the pseudo-range data delivered by the GPS receiver, where appropriate together with pseudo-velocity data.

The system of the invention may include a barometric altitude sensor, a magnetometer, and/or an air speed sensor, together with hybridization means for combining the measurements delivered by those sensors with the satellite range measurements, and where appropriate with the inertial measurements. It is then possible to combine the satellite position data with measurements of aircraft speed in (relative to) the air, heading and magnetic field measurements, and/or altitude, and/or barometric pressure measurements.

The invention claimed is:

1. A method of positioning a moving body by combining inertial data ($\vec{u}$) with data ($\vec{r}_m$) concerning the ranges between the moving body and satellites, the method being characterized by the following steps:

storing the range data in a FIFO memory (10) so as to have delayed range data available at the output from the memory;

combining the delayed range data with the inertial data to obtain an estimate ($\vec{\hat{x}}$) for position data of the moving body;

watching for the appearance of a fault (DSi) in the range data, and when such a fault is detected, modifying at least some of the data stored in the FIFO memory to reduce or eliminate its weight in the combination operation; and storing estimated satellite range data ($\vec{\hat{r}}$) as a function of inertial data and as a function of satellite ephemerides in a second FIFO memory (13) to have delayed estimates available at the output from said memory, the capacities of the two FIFO memories being equivalent so that the greatest delay value for the delayed estimate is identical to the greatest delay value for the delayed range data.

2. The memory according to claim 1, in which the combining operation includes subtracting delayed estimates of the range data as a function of the inertial data from the delayed range data, and weighting the result of the subtraction.

3. The method according to claim 2, in which the weighting gain (K) is constant.

4. The method according to claim 2, in which the weighting gain (K) is variable.

5. The method according to claim 4, in which the weighting gain is calculated as a function of the a priori covariance (R) of the errors affecting the range data, and as a function of the geometry of the constellation.

6. The method according to claim 1, in which the value of the greatest delay is of the order of 1 to 6 s.

7. The method according to claim 1, in which the storing and combination operations are performed at regular time intervals, at a frequency of the order of at least 0.5 Hz or at least 1 Hz.

8. The method according to claim 6, in which each FIFO memory serves to record a plurality,—or tens—of successive data vectors ($\vec{r}_m$, $\vec{\hat{r}}$), each range data vector ($\vec{r}_m$) comprising for each reception channel, i.e. for each satellite, a pseudo-range measurement together with the variance of the error affecting said measurement.

9. The method according to claim 1, in which in order to neutralize the data stored in the first FIFO memory, the confidence associated with said data is decreased, in particular by increasing the covariance of the errors associated with the data.

10. An aircraft positioning device (18) that is mounted or mountable on board an aircraft, the device comprising:
   an inertial unit (14) delivering inertial data ($\vec{u}$);
   a unit (11) for receiving satellite ranges and ephemerides and delivering range and/or position data ($\vec{r}_m$) to the unit (11); and
   a hybridization unit (12, 13, 16, 17, VPF) connected to the inertial unit to receive the inertial data and connected to the satellite range receiver unit to receive the range data, the hybridization unit delivering estimated position data ($\vec{x}$) as a function of the inertial data and of the range data;
   the device being further comprises:
   a FIFO memory (10) coupled with (inserted between) the range receiver unit (11) and the hybridization unit, to deliver the hybridization unit with delayed range data; and
   a neutralization unit (15) responsive to fault data (DSi) representative of faulty range data coming from a faulty satellite (si), and arranged, in the presence of said fault data, to modify at least some of the range data stored in the memory,
   wherein the hybridization unit comprises:
   an estimator unit delivering estimated range data calculated on the basis of inertial data and estimated position data;
   a second FIFO memory (13) arranged to store the estimated range data and to output delayed estimated range data;
   a subtraction unit (16) arranged to subtract the delayed estimated range data from the delayed range data delivered by the first FIFO memory; and
   a weighting unit (17) arranged to weight the data delivered by the subtraction unit.

11. The device according to claim 10, in which the hybridization unit comprises a recursive filter (12).

12. The device according to claim 11, in which the recursive filter is a Kalman filter.

13. The device according to claim 10, in which the neutralization unit (15) is connected to the range receiver unit (11) to receiver the fault data therefrom.

14. A program comprising code usable by a computer of a moving body to determine the moving body by combining inertial data ($\vec{u}$) with range data ($\vec{r}_m$) between the moving body and satellites, the program being characterized by the following steps:
   storing the range data in a FIFO memory (10) to have delayed range data available at the output from the memory;
   combing the delayed range data with the inertial data in order to obtain an estimate ($\vec{x}$) of position data for the moving body; and
   watching for the appearance of a fault (DSi) in the range data, and when such a fault is detected, modifying at least some of the data stored in the FIFO memory to reduce of eliminate its weight in the combination operation;
   and in which estimated satellite range data ($\vec{r}$) is recorded as a function of inertial data in a second FIFO memory (13) to make delayed estimates available at the output from said memory, the capacities of the two FIFO memories being equivalent so that the value of the greatest delay for the delayed estimate is identical to the value of the greatest delay for the delayed range data.

15. A program usable by a computer of a moving body to determine the position of the moving body, the program being characterized in that it implements a method in accordance with claim 1.

16. The method according to claim 7, in which each FIFO memory serves to record a plurality,—or tens—of successive data vectors ($\vec{r}_m$, $\vec{r}$), each range data vector ($\vec{r}_m$) comprising for each reception channel, i.e. for each satellite, a pseudo-range measurement together with the variance of the error affecting said measurement.

17. The device according to claim 10, in which the hybridization unit comprises a recursive filter (12).

* * * * *